United States Patent Office 3,370,010
Patented Feb. 20, 1968

3,370,010
MINERAL LUBRICATING OIL CONTAINING POLYMER HAVING ANTI-WEAR PROPERTIES
Henry V. Isaacson, Oak Forest, Ill., Stephen M. Kovach, Highland, Ind., and David W. Young, Homewood, Ill., assignors to Sinclair Research, Inc., New York, N.Y., a corporation of Delaware
No Drawing. Filed May 3, 1966, Ser. No. 547,144
7 Claims. (Cl. 252—59)

ABSTRACT OF THE DISCLOSURE

Anti-wear properties of mineral lubricating oil are enhanced by addition of minor amount of hydrogenated alpha-methylstyrene polymer having a molecular weight of about 550 to 5000, said polymer having been sufficiently hydrogenated to reduce its aromatic unsaturation content by at least about 70%; copolymers with styrene and/or dienes may be used, but it is preferred that the alpha-methylstyrene comprise at least about 60 wt. percent of the polymer.

---

This invention relates to novel liquid hydrocarbon compositions having improved anti-wear properties. More particularly, the invention concerns the use of a hydrogenated alpha-methylstyrene polymer as a synthetic bright stock for mineral oil hydrocarbons of lubricating viscosity.

Bright stocks are often blended with mineral oil lubricants in order to strengthen oil films and thereby enhance anti-wear properties, to obtain desired viscosity changes, etc. For example, minor amounts of bright stocks are frequently added to crank case oils for use in internal combustion engines in order to achieve certain prescribed SAE ratings and to decrease engine parts wear. Ordinarily, these bright stocks are derived from the heaviest portions of crude oils which are most often vacuum distillate or residual type feeds such as a crude lubricating oil. Conventional refining methods, such as solvent extraction, deasphalting, hydrogenation, etc., are employed to convert and extract from the feed a clear, heavy, liquid hydrocarbon, low in aromatic content and having the aforementioned utility as a blending component. Mineral oil-derived bright stocks, however, often have certain disadvantages which are difficult and costly to overcome. Their principal drawback is that because they are derived from the heavier fractions of crude oil they ordinarily contain high carbon residue properties resulting in spark-plug fouling, pre-ignition problems and poorer performance in general when used in internal combustion engines. Known refining techniques can be employed to reduce the high carbon residue properties of a mineral oil-derived bright stock but only at the expense of considerable loss in bright stock yield.

According to the present invention, a hydrogenated polymer of alpha-methylstyrene is employed as a synthetic bright stock in mineral oil hydrocarbons, such as petroleum hydrocarbons, of lubricating viscosity. Addition, in minor amounts, of the synthetic bright stock of this invention to lubricating oils provides compositions exhibiting low carbon residue and improved anti-wear properties, without adversely affecting the viscosity index of even the high VI mineral oils.

The polymers of alpha-methylstyrene employed in the present invention are those wherein at least about 70 percent, preferably at least about 90 percent, of the aromatic structure is hydrogenated, i.e., the aromatic unsaturation is reduced to a value of approximately 0 to 30 percent, preferably less than 10 percent, based upon the theoretical value of 100 percent for the unhydrogenated alpha-methylstyrene polymer. The polymers which, when hydrogenated to this degree, will perform as bright stocks are homopolymers of alpha-methylstyrene, and copolymers of alpha-methylstyrene with styrene and/or diene hydrocarbons having 4 to about 12 carbon atoms. Typical dienes which may be employed are 1,3-butadiene, isoprene, 2,3-dimethyl-1,3-butadiene, etc. Preferred polymers are those wherein at least about 60 weight percent thereof is made up of combined alpha-methylstyrene. Molecular weights of the polymers may be in the range of about 330 to 12,000, preferably about 550 to 5,000 and especially preferred about 800 to 2,000, or even about 1,200 to 1,800; S.U.S. viscosities at 210° F. may be about 15 to 8,000, preferably 50 to 1,000.

Any hydrogenation procedure which reduces the unsaturation of aromatic hydrocarbons may be employed in preparing the hydrogenated alpha-methylstyrene polymers used in this invention. Thus, for example, although the reaction may take place at room temperatures and atmospheric pressures, more often temperatures from about 150° F. to 480° F., preferably 210° F. to 420° F., and pressures from about 500 to 2500 lbs./sq. inch, preferably 800 to 1500 lbs./sq. inch, will be employed. Other suitable conditions may include a liquid hourly space velocity (LHSV) of about 0.1 to 10, preferably 0.1 to 2, and a molar ratio of hydrogen to polymer of about 1 to 50, preferably 5 to 10.

The hydrogenation is preferably carried out in the presence of molecular hydrogenation catalysts capable of promoting the hydrogenation such as, for example, metals, especially those of the 6th to the 8th groups of the Periodic Table, or their compounds, particularly their oxides and sulfides, either alone or in various mixtures with each other, or on carrier materials such as silica, zinc oxide, alumina, charcoal, kieselguhr, etc.

The hydrogenation may advantageously be conducted in the presence of a suitable organic solvent, most often one which is inert to the hydrogenation conditions such as, for instance, paraffins, naphthenes, and steric hindered unsaturated hydrocarbons. Any practical amount of solvent may be employed; a weight ratio of solvent to polymer of from about 0.1 to 10:1, for example, is often suitable, while a ratio of from 0.1 to 6:1 is preferred.

The amount of the hydrogenated polymer of alpha-methylstyrene to be added to the lubricating oil is dependent upon the particular lubricating oil employed, but in all cases will be that sufficient to improve the anti-wear property of the mineral oil as evaluated, for example, in a 500-hour Lincoln engine type test on engine parts such as rocker arm shafts, valve lifters, etc. Often the amounts will fall within the range of about 0.5 to 20% or more by weight, preferably 3 to 10% by weight, based on the weight of the mineral oil base. The synthetic bright stock can be incorporated in the liquid hydrocarbon base to form the compositions of this invention by simply blending with stirring at ordinary temperatures or, if desired, a mixture of the hydrocarbon base and the polymer can be heated to elevated temperatures, e.g., 100 to 250° F., with agitation. The compositions of the invention may also contain other additives commonly added to mineral oil lubricants as, for example, antioxidants, extreme pressure agents, corrosion inhibitors, detergents, oiliness agents, foam preventers and the like.

The following examples are included to further illustrate the invention. The parts and percentages given are by weight.

EXAMPLE I

A commercially available homopolymer of alpha-methylstyrene having the physical and chemical properties described below was subjected to hydrogenation.

Poly-α-methylstyrene (trimer)

| | |
|---|---|
| Color | Water White |
| Boiling range (5%–90%) at 5 mm. Hg, °C. | 150–300 |
| Specific gravity at 60/60° C. | 1.04 |
| Pounds/gallon at 25° C. | 8.66 |
| Viscosity at 60° C., centipoises | 700–1000 |
| Flash point (approximately), °C. | 182 |
| Fire point, °C. | 207 |
| Volatility, 100 hrs. at 100° C., percent | 18–20 |
| Refractive index at 60° C. | 1.57 |
| Acid number, less than | 0.1 |
| Iodine number, less than | 4.0 |
| Dielectric constant ($10^3$ c.p.s.) | 2.60 |
| Dissipation factor ($10^3$ c.p.s.) | 0.0005 |
| Color (iodine standard) | 0.85 |

Hydrogenation was conducted in a stainless steel Universal 1″ I.D. reactor heated by a radiant heat furnace. The temperature of the reactor was controlled by Fenwall thermostats and the temperature of the catalyst bed was measured by means of chromelalumel thermocouples located throughout the bed. The polymer-solvent feed was charged to the reactor by means of a Lapp pump. The diluent gas, hydrogen, was metered to the reactor through a Fischer-Porter armored rotameter. The liquid product was separated from the effluent gas in a Jerguson liquid-level gauge and then released to atmospheric pressure at room temperature. The effluent gas was measured by means of an American wet-test meter. The liquid product was submitted for distillation to strip the solvent from the polymer. The degree of saturation of the polymer was determined by measuring the hydrogen in and out of the reactor and by Nuclear Magnetic Resonance. Other conditions are outlined in Table I.

TABLE I

| | Run | | | |
|---|---|---|---|---|
| | 1 | 2 | 3 | 4 |
| Polymer | | Trimer | | |
| Solvent | | n-Heptane | | |
| Polymer/Solvent, wt. ratio | ¼ | ¼ | ¼ | 3/7 |
| Catalyst | 0.6% | Pt./Al$_2$O$_3$ | | |
| Conditions: | | | | |
| Temperature, °F | 250 | 290 | 300 | 400 |
| Pressure, p.s.i.g | 800 | 800 | 1,000 | 1,000 |
| LHSV [1] | 0.5 | 0.5 | 0.5 | 0.5 |
| H$_2$/H′C [2] | 7/1 | 7/1 | 7/1 | 7/1 |
| Product: Aromatic Content Hydrogenated, percent | 90 | 90 | 97 | 100 |

[1] Liquid hourly space velocity, i.e., the volume of feed processed per volume of catalyst per hour.
[2] Molar ratio of hydrogen to poly alpha-methylstyrene.

EXAMPLE II

The 97% hydrogenated alpha-methylstyrene trimer producer in Run 3 of Example I was blended with a solvent treated Mid-Continent neutral oil having a viscosity at 100° F. at 160 S.S.U. and a viscosity index of 96. The hydrogenated polymer was added to the base oil in various anti-wear enhancing proportions to test its effect on the viscosity index of the oil. Conditions and results are given in Table II.

TABLE II

| Sample | Vis. at 100° F., cs. | Vis. at 210° F., cs. | V.I. |
|---|---|---|---|
| Base Oil (Neat) | 34.42 | 5.363 | 96 |
| Base Oil+1% Hydrogenated Alpha-Methylstyrene Resin of Run 3 | 34.68 | 5.369 | 96 |
| Base Oil+3% Hydrogenated Alpha-Methylstyrene Resin of Run 3 | 35.52 | 5.447 | 96 |
| Base Oil+5% Hydrogenated Alpha-Methylstyrene Resin of Run 3 | 36.33 | 5.428 | 90 |

When evaluated in a standard 500 hour Lincoln engine test, the lubricant compositions of this example, wherein the synthetic bright stock of the present invention is included, exhibit improved anti-wear properties over that possessed by the base oil alone. In addition, the data in Table II show that the high viscosity index value of the lubricant is substantially unaffected by the addition of the bright stock. Thus, the hydrogenated alpha-methylstyrene polymers of this invention are seen to exhibit a highly sought after combination of properties when employed as bright stocks in mineral lubricating oils, namely, the ability to strengthen lubricating oil films without degrading the VI of the base oil.

What is claimed is:

1. A composition consisting essentially of a major amount of a base mineral oil of lubricating viscosity and a minor amount, sufficient to enhance anti-wear properties of the base mineral oil, of a hydrogenated addition polymer of about 60–100 weight percent of alpha-methylstyrene and about 0–40 weight percent of copolymerizable monomers selected from the group consisting of styrene and diene hydrocarbons of 4 to about 12 carbon atoms, said polymer having a molecular weight of about 550 to 5,000 and characterized by having an aromatic unsaturation content of less than about 30 percent of theoretical.

2. The composition of claim 1 wherein the hydrogenated polymer has an aromatic unsaturation content of less than about 10 percent of theoretical.

3. The composition of claim 1 wherein the hydrogenated polymer is essentially a hydrogenated homopolymer of alpha-methylstyrene.

4. The composition of claim 1 wherein the hydrogenated polymer has a molecular weight of about 800 to 2000.

5. The composition of claim 1 wherein the hydrogenated polymer is present in amounts from about 0.5 to 20%, by weight of the base mineral oil.

6. The composition of claim 3 wherein the hydrogenated polymer has a molecular weight of about 800 to 2000.

7. The composition of claim 6 wherein the hydrogenated polymer has an aromatic unsaturation content of less than about 10 percent of theoretical.

References Cited

UNITED STATES PATENTS

| 2,798,853 | 7/1957 | Young et al. | 252—59 X |
| 2,967,827 | 1/1961 | Bolt et al. | 252—59 X |

OTHER REFERENCES

Carmody et al.: "The Hydrogenation of Indene-Coumarone Resins," Industrial and Eng. Chem. vol. 32 (1940), pp. 684–692.

PATRICK P. GARVIN, *Primary Examiner.*

DANIEL E. WYMAN, *Examiner.*

W. CANNON, *Assistant Examiner.*